United States Patent [19]
Hinte

[11] Patent Number: 5,873,595
[45] Date of Patent: *Feb. 23, 1999

[54] TOW BAR ASSEMBLY

[76] Inventor: Thomas M. Hinte, 8125 Monetary Dr. Unit H3, Riviera Beach, Fla. 33404

[ * ] Notice: The term of this patent shall not extend beyond the expiration date of Pat. No. 5,516,140.

[21] Appl. No.: 644,336

[22] Filed: May 10, 1996

Related U.S. Application Data

[63] Continuation-in-part of Ser. No. 418,200, Apr. 7, 1995, Pat. No. 5,516,140.

[51] Int. Cl.$^6$ ........................................................ B60D 1/14
[52] U.S. Cl. ..................... 280/504; 280/491.1; 280/494; 280/495
[58] Field of Search ............................ 280/491.1, 491.3, 280/491.4, 491.5, 492, 493, 494, 495, 504

[56] References Cited

U.S. PATENT DOCUMENTS

| | | | |
|---|---|---|---|
| 2,120,422 | 6/1938 | Williams et al. | 280/492 |
| 3,419,285 | 12/1968 | Morehouse et al. | 280/491.4 |
| 3,979,138 | 9/1976 | George et al. | 280/478.1 |
| 4,073,508 | 2/1978 | George et al. | 280/478.1 |
| 4,326,730 | 4/1982 | Tomen | 280/502 |
| 4,714,264 | 12/1987 | Woestelandt | 280/456.1 |
| 4,722,542 | 2/1988 | Hensley . | |
| 4,811,967 | 3/1989 | Hensley . | |
| 4,856,805 | 8/1989 | Davis | 280/491.4 |
| 4,958,847 | 9/1990 | Williams | 280/502 |
| 4,962,830 | 10/1990 | Potts | 184/6.4 |
| 5,000,473 | 3/1991 | Johnson | 280/491.1 |
| 5,039,120 | 8/1991 | Stowe | 280/204 |
| 5,213,396 | 5/1993 | Avery et al. | 303/7 |
| 5,232,240 | 8/1993 | Johnson | 280/491.5 |
| 5,308,100 | 5/1994 | Heider et al. | 280/474 |
| 5,316,330 | 5/1994 | Bergeron | 280/477 |
| 5,342,076 | 8/1994 | Swindall | 280/479.2 |
| 5,346,243 | 9/1994 | Boeck | 280/478.1 |
| 5,354,087 | 10/1994 | Head | 280/490.01 |

FOREIGN PATENT DOCUMENTS

| 1171112 | 7/1984 | Canada | 280/491.4 |
|---|---|---|---|

OTHER PUBLICATIONS

Advertisement in Automatic Towing Products Division.
Advertisement—Roadmaster, Inc.

*Primary Examiner*—Peter M. Poon
*Attorney, Agent, or Firm*—Gifford, Krass, Groh, Sprinkle, Patmore, Anderson & Citkowski, P.C.

[57] ABSTRACT

A tow bar assembly adapted to extend between a towing vehicle and a towed vehicle. A frame is provided which includes a bearing element secured to the front end of the frame and a mounting element secured to the rear end of the frame. The mounting element is adapted to be selectively connected to the receiver hitch of a towing vehicle, while the bearing element extends rearward toward the towed vehicle in one embodiment. A pair of elongated, telescopic swing arms are pivotally secured to the bearing element and extend to the towed vehicle for attachment thereto. The bearing element further includes a yoke rotatable about a ball joint having at least two degrees of freedom which allows for movement of the swing arms in both vertical and horizontal planes. The swing arms further include pivot flanges that are pivotally secured to the swing arms at an end nearest the towed vehicle. A pair of tow vehicle mounting brackets extend from the frame of the towed vehicle vertically upward, such that when not in use, the tow bar assembly may be collapsed and securely stored adjacent the rear bumper of the towing vehicle. Alternate embodiments include fifth wheel and fixed arm tow bar assemblies.

10 Claims, 7 Drawing Sheets

TOW BAR ASSEMBLY

This is a continuation-in-part of application Ser. No. 08/418,200 filed Apr. 7, 1995, now U.S. Pat. No. 5,516,140.

BACKGROUND OF THE INVENTION

I. Field of the Invention

The present invention relates to a tow bar extending between a towing vehicle and a towed vehicle in general, and more particularly, to a novel collapsible tow bar assembly that is easily secured to the towing vehicle when not in use which provides increased flexibility of movement on uneven or bumpy terrain.

II. Background of the Invention

As cross-country travel has become more popular over the last few decades, increasing numbers of individuals and families have turned to the recreational vehicle (RV) as a convenient, fun and exciting way to tour the country. Although the RV is well suited to cross-country driving on interstate highways and the like, city and local driving is often more difficult due to the RV's large size. The ability to tow vehicles behind the RV provides the RV owner with greater freedom and flexibility once the destination is reached. Many different tow bar designs have been used over the years in an effort to properly couple the towed vehicle to the RV. Convenience, safety and ease of operation are increasingly becoming important considerations in tow bar design since an ever larger percentage of the cross-country travelers today are senior citizens and retirees.

Additionally, many forms of recreation necessitate towing a trailer over difficult terrain. For example, snowmobiles, boats and horses are frequently trailered to remote locations having uneven or bumpy terrain.

A tow bar in use today is that disclosed in U.S. Pat. No. 4,856,805 issued to Davis. Davis discloses a triangular shaped collapsible tow bar that is secured to the towed vehicle when not in use. The tow bar extends from the towed vehicle and connects to the hitch ball attached to the RV. Since the tow bar in Davis is secured to the front end of the towed vehicle when not in use, the tow bar necessarily protrudes from and adds extra weight to the front end of the towed vehicle. The extra weight and bulk on the front end may reduce the driveability of the car. Moreover, use of a towing ball extending from the rear of the RV to couple to the tow bar requires that the user carefully align the towed vehicle with the RV.

An improvement of the Davis tow bar is disclosed in U.S. Pat. No. 5,232,240 issued to Johnson. Johnson discloses a collapsible tow bar that may be removably installed on a receiver hitch of a towing vehicle. The tow bar includes a frame and a pair of elongated bars that extend rearward from the frame and provide for the connection with the vehicle to be towed. The bars are connected to a pivot block which is mounted to the forward portion of the frame, so as to permit the pivot block and bars to pivot from a horizontal position to a generally vertical storage position. The pivot block is mounted such that the bars are rotatable as a unit along an axis parallel to the direction which the vehicle is towed. Hooks are mounted at the ends of the elongated bars and provide for connection with U-shaped loops mounted to the bumper of the towed vehicle.

While Johnson solved some of the problems of the prior art, namely providing a collapsible tow bar which could be stored on the towing vehicle, his invention failed to address some significant problems, including providing for the smooth movement of the swing arms in planes parallel and perpendicular to the movement of the towed vehicle.

Accordingly, it is therefore a general object of the present invention to provide an improved tow bar assembly that is economical to manufacture, compact, light weight, simple to use, and can be used on a variety of different vehicles.

It is a further object of the present invention to provide a tow bar assembly that is collapsible, and quickly and easily stored on the towing vehicle when not in use.

It is a further object of the present invention to provide a tow bar system that may be readily extended for towing purposes and simply connected to the towed vehicle.

It is a further object of the present invention to provide a tow bar system that incorporates a yoke and ball joint to provide increased flexibility of movement along axes both parallel and perpendicular to the direction of vehicle motion to facilitate towing on uneven or bumpy terrain.

In accordance with these and many other objects, I have invented a unique tow bar assembly that solves the problems that others have failed to address.

SUMMARY OF THE PRESENT INVENTION

The tow bar system of the present invention includes a frame having a bearing element secured to the front end of the frame and a mounting element secured to the rear end of the frame. The mounting element is adapted to be selectively connected to the receiver hitch of a towing vehicle, while the bearing element extends rearward toward the towed vehicle. A pair of elongated, telescopic swing arms are pivotally secured to the bearing element and extend to the towed vehicle for attachment thereto. The bearing element further includes a yoke rotatable about a ball joint having at least two degrees of freedom which allows for movement of the swing arms in both vertical and horizontal planes. The swing arms further include pivot flanges that are pivotally secured to the swing arms at their ends nearest the towed vehicle. The pivot flanges each have a pinhole extending therethrough that allow for connection to the towed vehicle. A pair of tow vehicle mounting brackets extend vertically upward from the frame of the towed vehicle. A removable locking pin assembly is provided for easily connecting the pivot flanges of the swing arms to the mounting brackets. When not in use, the tow bar assembly may be collapsed and securely stored adjacent the rear bumper of the towing vehicle such that in the stored position, each swing arm is parallel to the rear bumper.

The present invention also includes a fifth wheel adaptation, wherein the bearing element, yoke and ball joint configuration described above is disposed between the base of a fifth wheel hitch which is mounted to a towing vehicle, and a saddle which engages the towed vehicle.

The present invention may also be configured such that the arms which connect the yoke and ball joint to the towed vehicle are fixedly attached to the yoke or, alternatively, are removable and interchangeable with other arm configurations, such as a single, unitary arm upon which a conventional ball hitch is affixed, so as to permit a conventional trailer and hitch assembly to be easily and economically adapted to the present invention.

The present invention may also be configured such that the ball joint is releasably positioned within the bearing element.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF A PREFERRED EMBODIMENT OF THE PRESENT INVENTION

It should be understood that the following description of the preferred embodiment is merely exemplary in nature and is in no way intended to limit the invention or its applications or uses.

For example, the following description of the tow bar assembly, although provided for connection between a recreational vehicle and an automobile in the preferred embodiment, is intended to be typical of tow bar assemblies that may be used between a number of different towing vehicles such as sport-utility vehicles and pick-up trucks, and a number of towed vehicles such as campers, trailers, and boats. The present invention may also be utilized to modify conventional ball-and-socket hitches, enabling users to upgrade their existing hitch systems to obtain the increased flexibility of the present invention. Modifications and variations of the present invention will readily occur to those skilled in the art.

Figure 1:
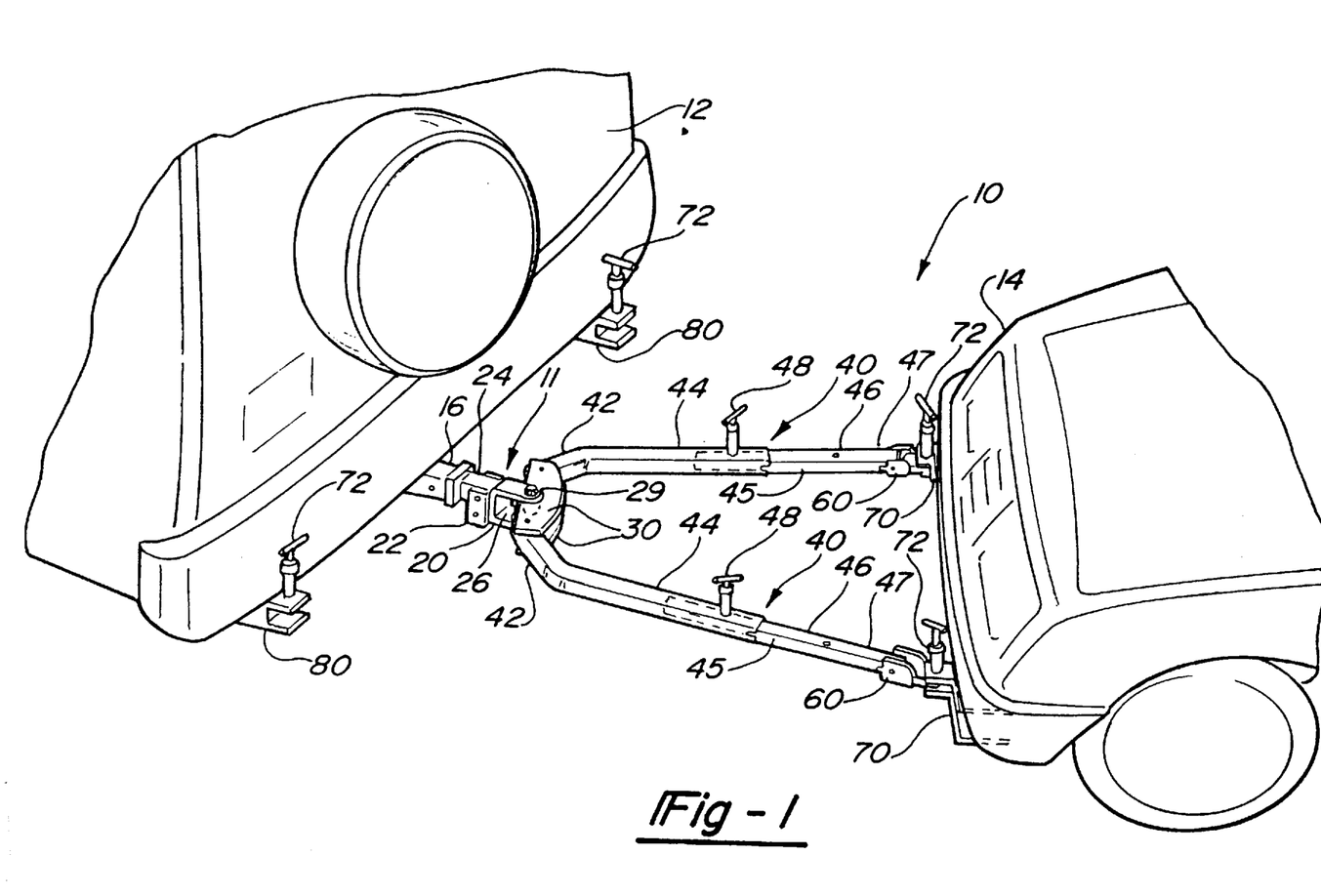
FIG. 1 is a perspective view of the present invention shown mounted in a receiver hitch and in towing position with the swing arms extended and secured to the towed vehicle.

Referring now to the drawings, in which corresponding parts are identified with the same reference numeral, and more particularly to FIG. 1, a preferred embodiment of the tow bar assembly of the present invention is designated generally at 10 and is shown mounted on a conventional hitch tube 16 extending from a receiver hitch on the back of a towing vehicle 12, such as an RV, to the bumper of a towed vehicle 14, such as an automobile. The tow bar assembly 10 includes a frame 11 having a rearwardly extending bearing element 20 fixed to a forward extending mounting element 22. The mounting element 22 consists of a conventional hitch bar 24 that can be releasably inserted into the hitch tube 16. The hitch bar 24 has an aperture 25 in its side for receiving a locking pin which may be passed through the aperture to secure the hitch bar 24 to the hitch tube 16.

Figures 2, 3:
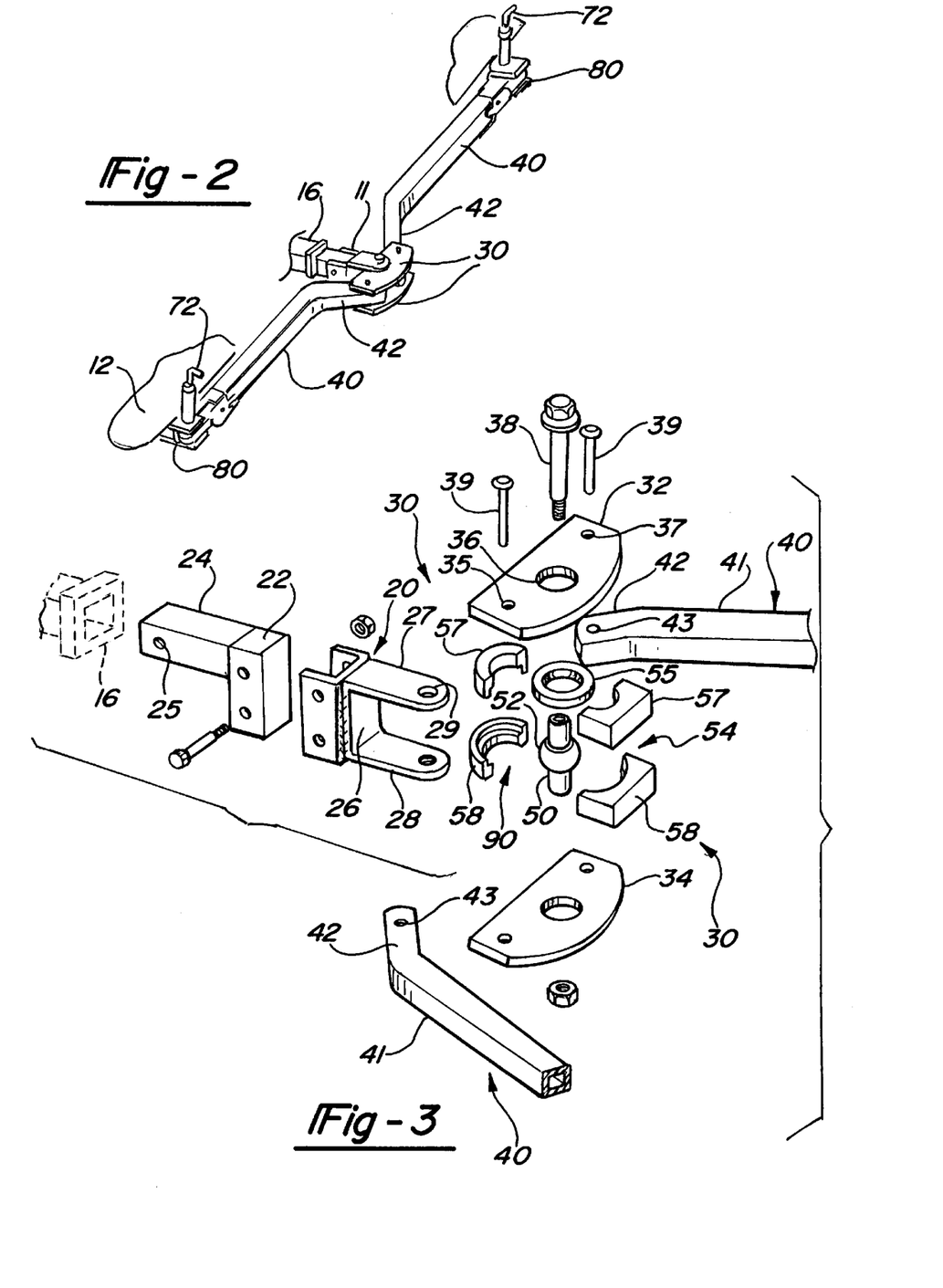
FIG. 2 is a perspective view of the present invention shown in a storage position adjacent the rear bumper of the towing vehicle.
FIG. 3 is an exploded perspective view of the mounting element and the bearing element of the present invention.

The bearing element 20 includes a generally C-shaped member 26 having a top surface 27 and a bottom surface 28 and a bolt hole 29 extending therebetween. A yoke 30 extends between the bolt hole 29 on the top surface 27 and the bottom surface 28 (shown more particularly in FIG. 3). The yoke 30 includes an upper semicircular plate 32 and a lower semicircular plate 34 which provide pivotal attachment between the bearing element 20 and complementary swing arms, generally indicated by 40. A right aperture 35, a center aperture 36, and a left aperture 37 extend between the upper plate 32 and the lower plate 34. The center aperture 36 is aligned with the bolt hole 29 of the C-shaped member 26 and a sleeve 50 extending from the top surface 27 to the bottom surface 28 of the C-shaped member 26. A shoulder bolt 38 is provided which extends downward from the top surface 27 of the C-shaped member 26, through the upper semicircular plate 32 and the sleeve 50, through the lower semicircular plate 34, and finally through the bottom surface 28 of the C-shaped member 26. As shown in FIG. 3, the sleeve 50 has a ball 52 welded thereto.

The upper semicircular plate 32 and the lower semicircular plate 34 of the yoke 30 are parallel and spaced apart to receive a pair of pivotal elongated swing arms 40. The plates 32 and 34 of yoke 30 may take a variety of shapes, including quadrilateral, oblong, circular or any combination of shapes. As shown in FIG. 3, the right aperture 35 and the left aperture 37 are designed to receive connector bolts 39. The forward end 41 of each swing arm 40 has a projecting offset flange 42 with an aperture 43 therethrough. Complimentary bolts 39 are journaled through the right aperture 35 and the left aperture 37 of the upper plate 32, through the projecting offset flange 42 of each swing arm 40, and then through the lower plate 34. Corresponding nuts fasten the bolts in position.

Figures 6, 7, 8, 9:
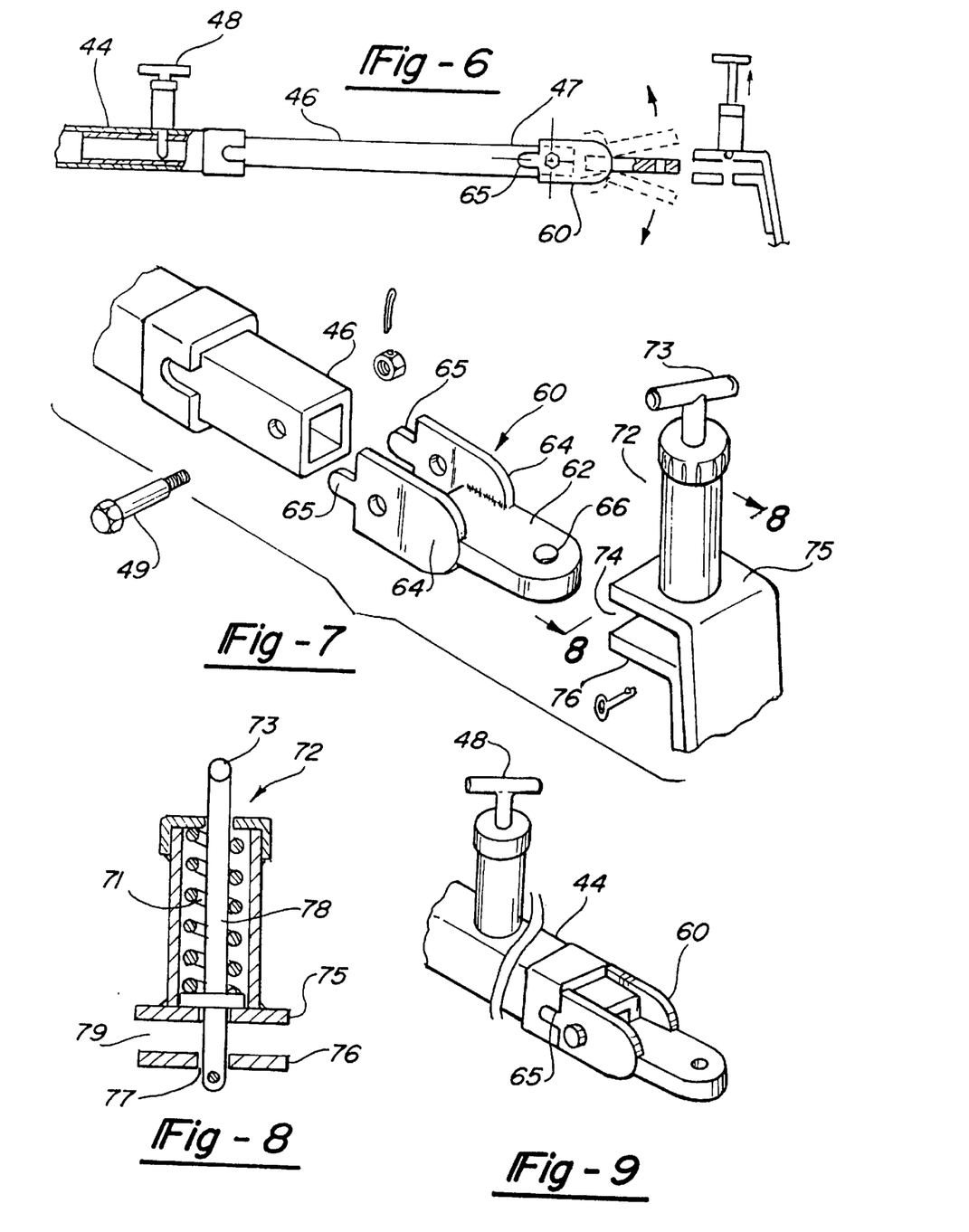
FIG. 6 is side view of a swing arm of the present invention extending toward the towed vehicle.
FIG. 7 is an exploded perspective view of a pivot flange extending between a swing arm and a locking pin assembly on the towed vehicle.
FIG. 8 is an enlarged side view of the locking pin assembly of the present invention.
FIG. 9 is a side view showing the connection between a pivot flange and a locking pin assembly.

Each swing arm 40, as shown in FIG. 1, is generally rectangular in cross-section and comprises an outer rail 44 and an inner rail 46, the inner rail 46 being slidably adjustable therein. The arm 40 may alternatively have a circular or other cross-section. The inner rail 46 has a plurality of apertures extending therethrough (not shown) that allow for the removable insertion of a pin. A locking pin assembly 48 is attached at an end of the outer rail 44 and controls the telescopic movement of the inner rail 46 with respect to the outer rail 44. The inner rail 46 includes a forward end 45 securable to the outer rail 44 and a rearward end 47 that is free to extend to the towed vehicle 14. A pivot flange 60 is secured to the rearward end 47 of the inner rail 46. As better shown in FIG. 7, the pivot flange 60 includes a planar member 62 securely attached to opposing surfaces 64. Each of the opposing side surfaces 64 includes an outwardly extending nipple 65 and each is pivotally secured to the inner rail 46 by a bolt 49 extending therethrough. The planar member 62 includes an aperture 66 for receiving a pin therethrough for connection to the towed vehicle 14. As shown in FIG. 6, the pivot flange 60 is capable of movement in a vertical plane to facilitate connection to the towed vehicle 14.

Referring back now to FIG. 1, a pair of mounting brackets 70, are provided that are secured to the frame of the towed vehicle 14 and extend upward in front of the bumper of the towed vehicle 14. A locking pin assembly 72 is releasably secured to each mounting bracket 70 and provides for connection with the planar members 62 of the pivot flange 60. As shown in FIGS. 1, 6, 7 and more particularly in FIG. 8, the locking pin assembly 72 comprises a U-shaped receiving member 74 having a top parallel face 75 and a bottom parallel face 76, forming a channel 79 therebetween, each face having a corresponding aperture 77, and a spring actuated pin 78 moveable through said aperture 77 and between the channel 79. The pin 78 is moveable between its normally closed position where the pin 78 extends vertically through the aperture 77 and channel 79, and an open position where the pin 78 is pulled vertically up and away from the channel 79. The pin 78 is biased in the closed position through the action of a compression spring 71. To securely fasten the pivot flange 60 to the mounting bracket 70, the user need merely exert an upward force on the handle 73 thereby removing the pin 78 from the receiving channel 79, insert the pivot flange 60 in the channel 79, and then release the handle 73 to allow the pin 78 to extend therethrough.

As depicted in FIGS. 1 and 2, swing arms 40 are moveable from an extended position whereby the swing arms 40 extend to the towed vehicle 14 and a storage position whereby the arms are pulled back and securely fastened to the rear of the towing vehicle 12. Two retaining brackets 80 are attached to opposite ends of the rear of the towing vehicle 12, and connected to the swing arms 40 by the manipulation of locking pin assemblies 72 as described earlier. As best shown in FIG. 1, the projecting flange 42 of each swing arm 40 is slightly offset to provides a more compact storage position.

Figure 4:
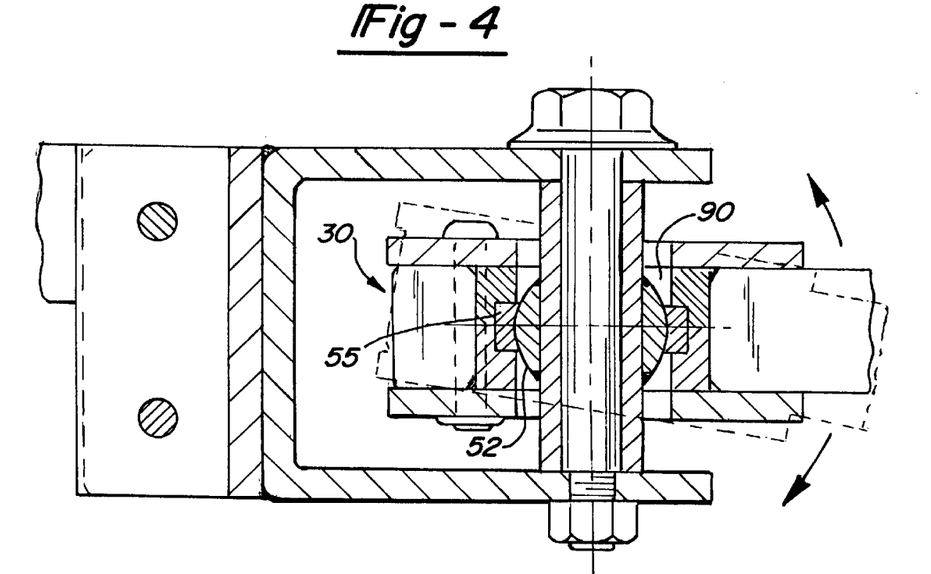
FIG. 4 is an enlarged side view of the yoke and ball joint of the present invention.
Figure 5:
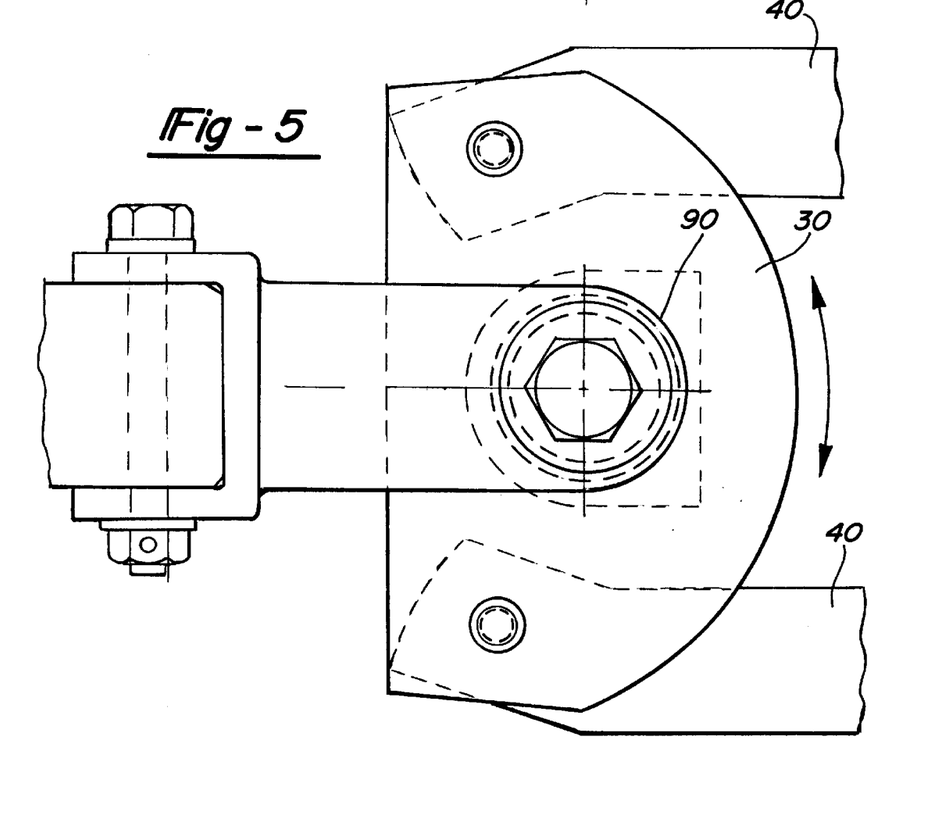
FIG. 5 is a top view of the yoke of the present invention showing the pivotal connection of the swing arms.

Referring now to FIG. 3, the yoke 30 is more particularly shown. The yoke 30 includes a transverse sleeve 50 with a substantially spherical shaped ball 52 welded between the ends of the sleeve 50. The sleeve 50 is secured to the yoke 30 through the insertion of a shoulder bolt 38 extending through the center aperture 36 of the upper semicircular plate 32 and the lower semicircular plate 34. An outer ball race 55 circumferentially surrounds the ball 52 and facilitates the pivotal movement of the yoke 30 about the ball 52 and sleeve 50, forming a ball joint 90. An outer race retainer 54 surrounds the ball 52 and outer race 55 and further includes two upper semicircular parts 57 and two lower semicircular parts 58. Race retainer 54 may also be quadrilateral or shaped otherwise. The upper parts 57 are welded to the upper semicircular plate 32 and the lower parts 58 are welded to the lower semicircular plate 34, such that the ball 52 is located therebetween. As shown in FIG. 4, the yoke 30 is moveable about the ball joint 90 in a vertical plane coinciding with the movement of the swing arms 40. Neither the ball 52 nor the sleeve 50 move with the movement of the yoke 30. The movement of the yoke 30 is dependent on the movement of outer race 55 about the ball 52 within the confines of the outer race retainer 54. As shown in FIG. 5, the yoke 30 is also rotatable in a horizontal plane about an axis defined by the ball joint 90.

Figure 16:
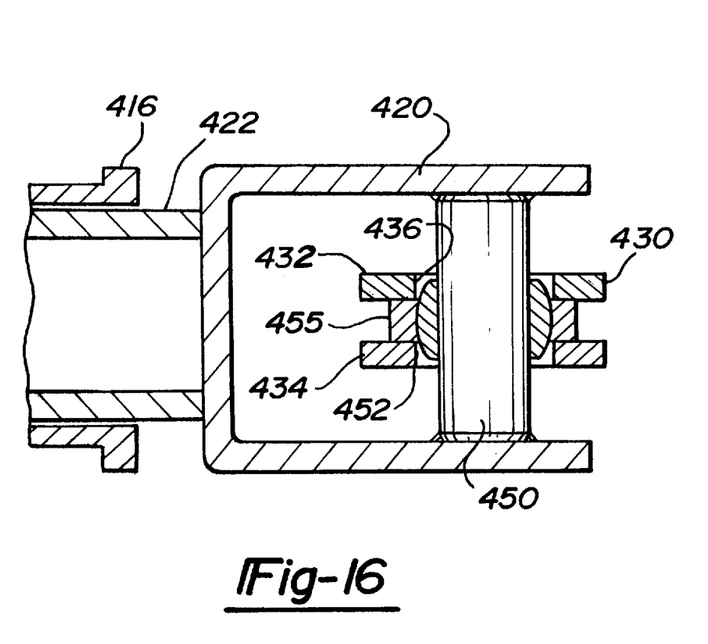
FIG. 16 is a cross-sectional view of an alternate embodiment of the present invention shown mounted in a hitch tube.

In an alternate embodiment depicted in FIG. 16, outer ball race 455 encircles ball 452. Yoke 430 directly contacts outer ball race 455 and performs functions similar to the combined yoke-outer race retainer structures in the prior embodiments.

The tow bar 10 is connected to the towing vehicle 12 by inserting the mounting element 22 into the receiver hitch tube 16 and inserting a locking pin therethrough, as shown in FIG. 1. Telescopic swing arms 40 may then be adjusted to the lengths necessary by manipulating the pin assemblies 48 manually or by allowing the arms to adjust automatically to the proper length as the towing vehicle begins to move forward. Swing arms 40 are then secured to the towed vehicle 14 by connecting pivot flanges 60 to the mounting brackets 70 by extending a pin therethrough. The yoke 30 is rotatable about the ball joint 90 and allows the tow bar assembly 10 to properly tow vehicles over bumps or grades in the road. When the towing vehicle 12 turns, the yoke 30 will pivot about the ball joint 90 to follow the movement of the towing vehicle 12. At all times, the yoke 30 maintains a parallel alignment with the bumper of the towed vehicle 14.

When the destination has been reached, the pivot flanges 60 may be easily and quickly disconnected from the towed vehicle 14 by exerting an upward force on the handle 73 of the respective pin assemblies 72. The tow bar assembly 10 may then be collapsed by sliding the inner rail 46 of swing arm 40 nearly entirely inside the outer rail 44. As shown in FIG. 9, the nipples 65 of the pivot flanges 60 prevent sliding the inner rail 46 entirely into the outer rail 44 and ensure that the pivot flanges 60 are no longer pivotal. Each swing arm 40, independently, may then be pulled back and secured to respective retaining brackets 80 on the towing vehicle 12. In the stored position, the swing arms 40 are parallel to the rear of the towing vehicle 12.

Figure 10:
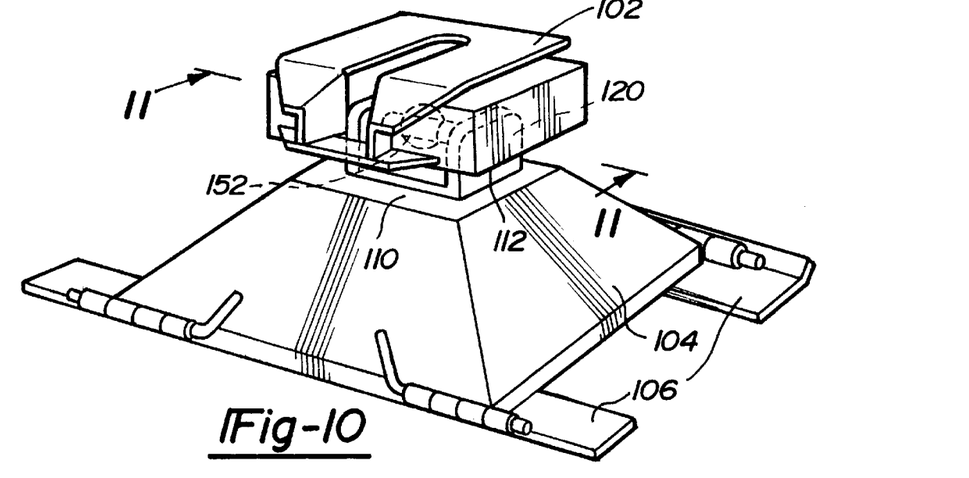
FIG. 10 is a perspective view of an adaptation of a fifth wheel hitch suitable for use with the present invention.
Figure 11:
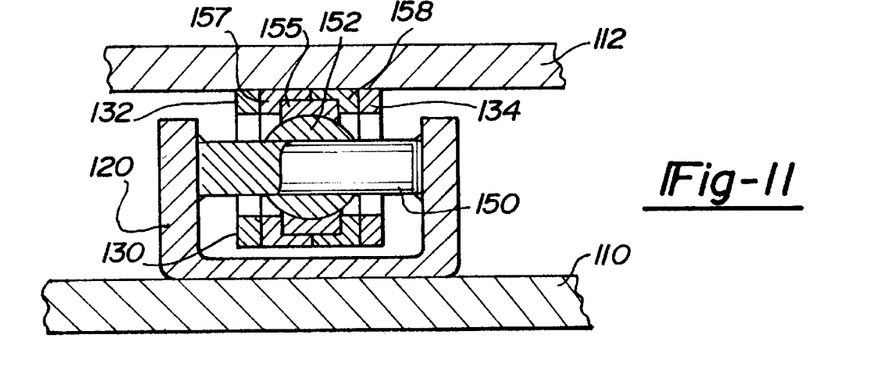
FIG. 11 is a cross-sectional view of an alternate embodiment of the present invention suitable for use with the fifth wheel hitch depicted in FIG. 10.

In an alternate embodiment, the ball joint-yoke apparatus described in the above discussion is utilized in a fifth wheel hitch. As depicted in FIGS. 10–11, a base 104 having an upper plate 110 is mounted on rails 106 to the bed of a truck which is the towing vehicle. A variety of alternate attachment methods may be used to mount base 104 to the towing vehicle. Saddle 102 engages the standard fifth wheel mechanism attached to the towed vehicle and has a lower plate 112. Positioned between plate 112 of saddle 102 and plate 110 of base 104 is the ball joint-yoke apparatus described above. Bearing element 120 is mounted to plate 110 of base 104, column 150 is mounted to bearing element 120. Yoke 130 is mounted to plate 112 of saddle 102, thereby permitting saddle 102 to universally rotate about ball 155.

Figure 12:
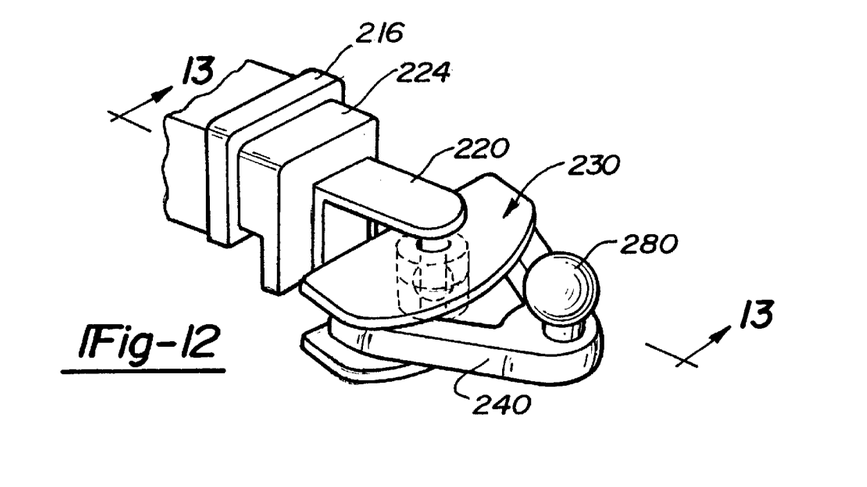
FIG. 12 is a perspective view of an alternate embodiment of the present invention permitting conversion of a standard ball and socket hitch mechanism.
Figure 13:
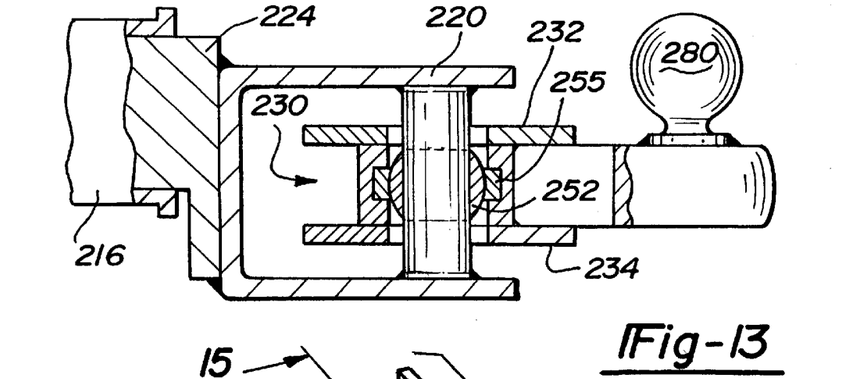
FIG. 13 is a cross-sectional view of the alternate embodiment depicted in FIG. 12.

A further alternate embodiment of the present invention, depicted in FIGS. 12 and 13, enables a user to adapt a conventional ball-and-socket trailer hitching system to obtain the enhanced trailering flexibility offered by the present invention. FIG. 12 is a top view of the embodiment and depicts a unitary arm 240 fixedly attached between the upper plate 232 and lower plate 234 of yoke 230, such as by welding. Unitary arm 240 may also be releasably attached, by such a locking pin assembly 72 depicted in FIG. 8. As best shown in FIG. 13, a conventional ball hitch 280 is attached to the upper surface of arm 240. The ball hitch 280 may be attached to arm 240 by various means, such as welding or bolting. The bearing element 220 is fixedly attached to one end of hitch bar 224, the other end of hitch bar 224 insertable into a conventional hitch tube 216. A user simply inserts hitch bar 224 into hitch tube 216, and attaches the conventional socket attached to the towed vehicle to hitch ball 280. This embodiment enables a user to gain the benefits of the present invention without costly modifications to an existing trailer.

Figures 14, 15:
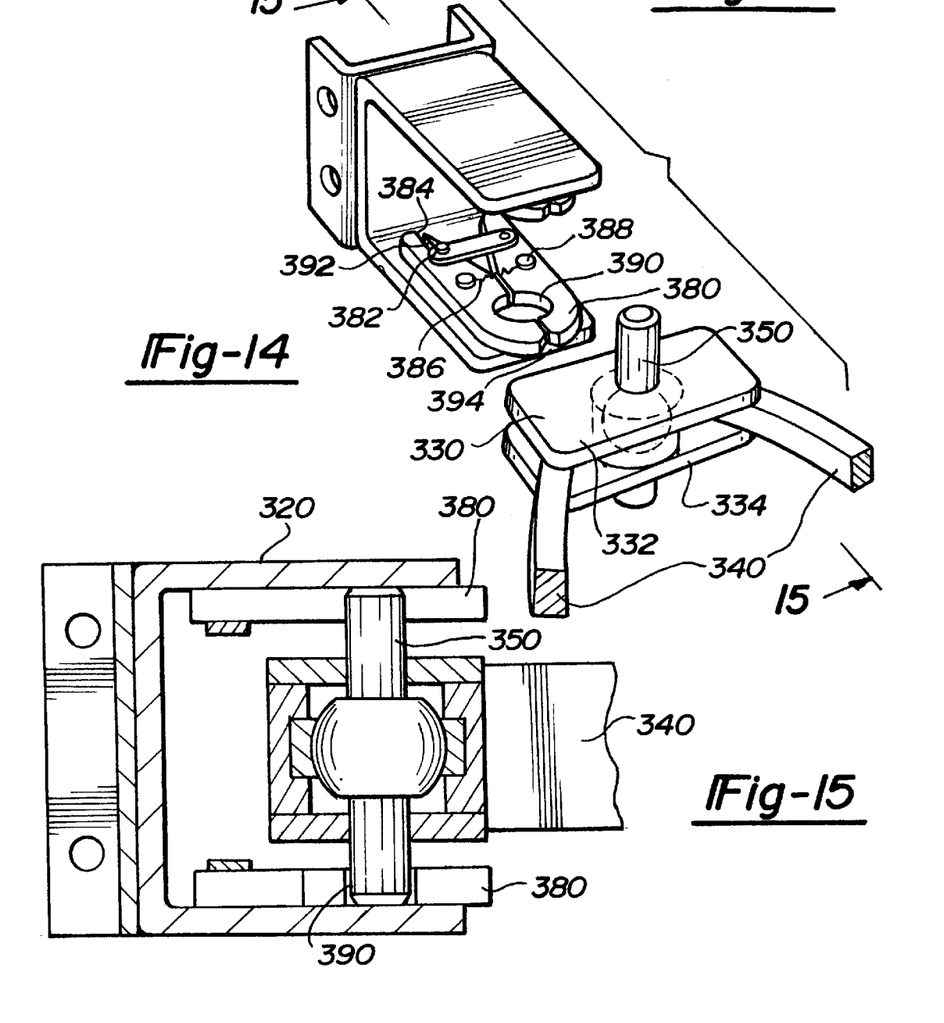
FIG. 14 is a perspective view of an alternate embodiment of the means for attaching the column of the ball joint to the bearing element.
FIG. 15 is a cross-sectional view of the alternate embodiment depicted in FIG. 14.

In an alternate embodiment of the present invention, depicted in FIG. 14, bearing element 320 attached to the towing vehicle (not shown) is configured to snappably receive yoke 330, which is attached to the towed vehicle (not shown). Column 350 is received in spring-loaded jaws 380 such that the ends of column 350 are received in gap 390 in jaws 380. Spring 386 is fixed to posts 388 such that jaw 380 is biased in a closed position. Locking bar 382 having a pin 392 is pivotally attached to jaw 380. When locking bar 382 is pivoted such that pin 392 is not positioned within groove 384, jaw 380 is free to open as column 350 is moved to engage the forward and inwardly angled front surface 394 of jaws 380. Jaws 380 will open to permit column 350 to move into gap 390. Once column 350 is within gap 390, spring 386 causes jaws 380 to close. Locking bar 382 is then pivoted such that pin 392 is positioned within groove 384, thereby preventing jaws 380 from opening and releasing column 350 and the attached towed vehicle.

As will be apparent to one of ordinary skill in the art, the preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, I claim:

1. A tow bar assembly comprising:

a bearing element having a channel;

means for attaching the bearing element to a towing vehicle;

a column having two ends, the column passing through approximately the center of a substantially spherical ball;

a yoke universally rotatable about the ball, the yoke having an upper and lower plate, said plates having at least one aperture thereon, the yoke including an outer ball race having a circular ring rotatable about the circumference of the ball thereby forming a ball joint, an outer race retainer surrounding the ball and having two upper semicircular sections welded to the upper plate and two lower semicircular sections welded to the lower plate such that the outer ball race is moveable therein;

the ends of the column passing through the apertures and attached to the bearing element; and means for attaching the yoke to an object to be towed.

2. The assembly of claim 1 further comprising an outer race retainer encircling the outer ball race, the outer race retainer having upper and lower surfaces, the upper plate of the yoke attached to the upper surface of the outer race retainer, the lower plate of the yoke attached to the lower surface of the outer race retainer.

3. The assembly as claimed in claim 1, wherein the towing vehicle further comprises a hitch tube, the means for attaching the bearing element to the towing vehicle comprises a hitch bar having a first and second end, the first end attached to the bearing element, the second end insertable into the hitch tube.

4. The assembly as claimed in claim 1, wherein the means for attaching the yoke to the object to be towed comprises two arms, each arm having a first and second end, the first end secured between the upper and lower plates of the yoke, the second end attached to the object to be towed.

5. The assembly as claimed in claim 1, wherein the means for attaching the yoke to the object to be towed comprises a connecting member having an upper surface, a first end and a bifurcated second end secured between the upper and lower plates of the yoke, and a towing ball secured to be upper surface of the connecting member at the second end.

6. The assembly as claimed in claim 1 wherein the towing vehicle further comprises a truck bed, and means for attaching the bearing element to the towing vehicle comprises a base mounted to the truck bed.

7. The assembly as claimed in claim 1 wherein the means for attaching the yoke to the object to be towed comprises a fifth wheel saddle attached to the yoke.

8. A tow bar assembly comprising:

a column having two ends, the column passing through approximately the center of a substantially spherical ball;

a yoke universally rotatable about the ball, the yoke having an upper and lower plate, said plates having at least one aperture thereon, the yoke including an outer ball race having a circular ring rotatable about the circumference of the ball thereby forming a ball joint, an outer race retainer surrounding the ball and having two upper semicircular sections welded to the upper plate and two lower semicircular sections welded to the lower plate such that the outer ball race is moveable therein;

the ends of the column passing through the apertures;

means for attaching the column to a towing vehicle; and means for attaching the yoke to an object to be towed.

9. The assembly as claimed in claim 8 wherein the towing vehicle further comprises a hitch tube, and means for attaching the column to a towing vehicle comprises a hitch bar having a first and second end, the first end insertable into the hitch tube of the towing vehicle, the second end having means to grasp the column.

10. The assembly as claimed in claim 9, wherein the means to grasp the column comprises a pair of lockable jaws mounted in a bearing element.

* * * * *